US 6,594,574 B2

(12) United States Patent
Isogai et al.

(10) Patent No.: US 6,594,574 B2
(45) Date of Patent: Jul. 15, 2003

(54) INTER-VEHICLE DISTANCE CONTROL APPARATUS AND A RECORDING MEDIUM FOR THE SAME

(75) Inventors: Akira Isogai, Anjo (JP); Takao Nishimura, Nagoya (JP); Eiji Teramura, Okazaki (JP)

(73) Assignee: Denso Corporation, Kariya (JP)

( * ) Notice: Subject to any disclaimer, the term of this patent is extended or adjusted under 35 U.S.C. 154(b) by 112 days.

(21) Appl. No.: 09/799,107

(22) Filed: Mar. 6, 2001

(65) Prior Publication Data

US 2001/0044692 A1 Nov. 22, 2001

(30) Foreign Application Priority Data

Mar. 7, 2000 (JP) .......................... 2000-062006

(51) Int. Cl.[7] .............................................. B60K 31/00
(52) U.S. Cl. ...................... 701/96; 701/301; 340/903; 340/436; 180/170
(58) Field of Search ............................. 701/93, 96, 97, 701/301; 123/352; 180/170, 171, 173, 176, 177, 179; 340/436, 903

(56) References Cited

U.S. PATENT DOCUMENTS

| 4,896,267 A | * | 1/1990 | Frantz et al. ................ 180/179 |
| 5,014,201 A | * | 5/1991 | Tsukahara et al. ........... 180/170 |
| 5,054,570 A | | 10/1991 | Naito et al. |
| 6,125,321 A | | 9/2000 | Tabata et al. |
| 6,178,372 B1 | * | 1/2001 | Tabata et al. .................. 701/97 |
| 6,282,484 B1 | * | 8/2001 | Enomoto et al. .............. 701/93 |
| 6,362,729 B1 | * | 3/2002 | Hellmann et al. ........... 701/301 |
| 6,366,846 B2 | * | 4/2002 | Iriyama ....................... 701/97 |

FOREIGN PATENT DOCUMENTS

| JP | 2-102834 | 4/1990 |
| JP | 2-171343 | 7/1990 |
| JP | 4-231232 | 8/1992 |
| JP | 7-47865 | 2/1995 |
| JP | 10-166900 | 6/1998 |
| JP | 11-39586 | 2/1999 |

* cited by examiner

Primary Examiner—Gary Chin
(74) Attorney, Agent, or Firm—Posz & Bethards, PLC

(57) ABSTRACT

It judges whether a decelerator, such as fuel cut, over-drive cut, down shifting, braking, is in a temporarily unusable condition and further judges that it is necessary to drive the decelerator by the inter-vehicle control. It continues control by the inter-vehicle control means when it is necessary to drive the decelerator by the inter-vehicle control and it is judged that the decelerator is in the temporarily unusable condition. It informs the driver of data in the temporary unusable condition and further inform the driver of alarm data when the actual inter-vehicle distance is shorter than a reference. The data agrees with the alarm data. The same operation may be effected regarding accelerator. The temporarily unusable condition may be caused by continuous operation of brake pressure actuator longer than the rating.

15 Claims, 13 Drawing Sheets

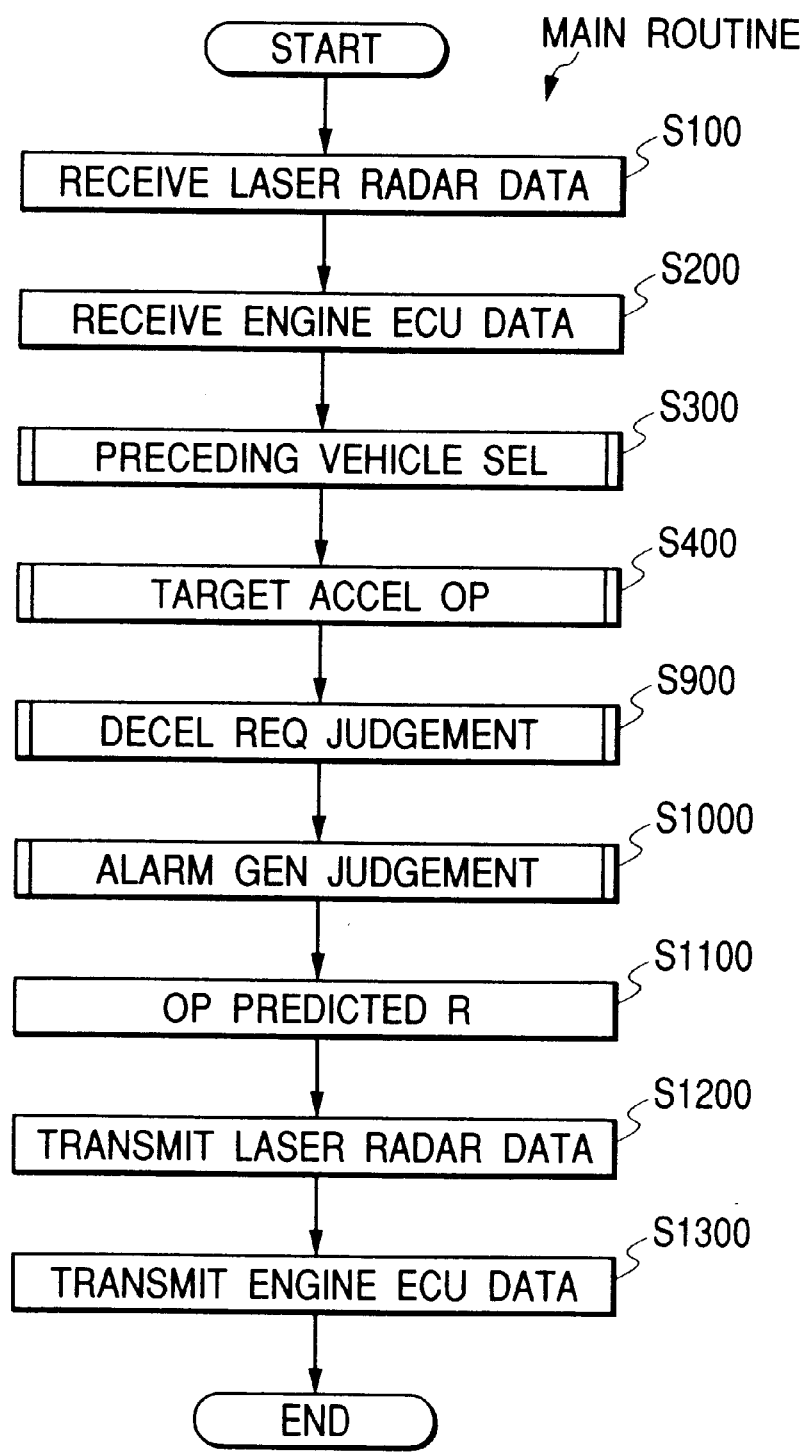

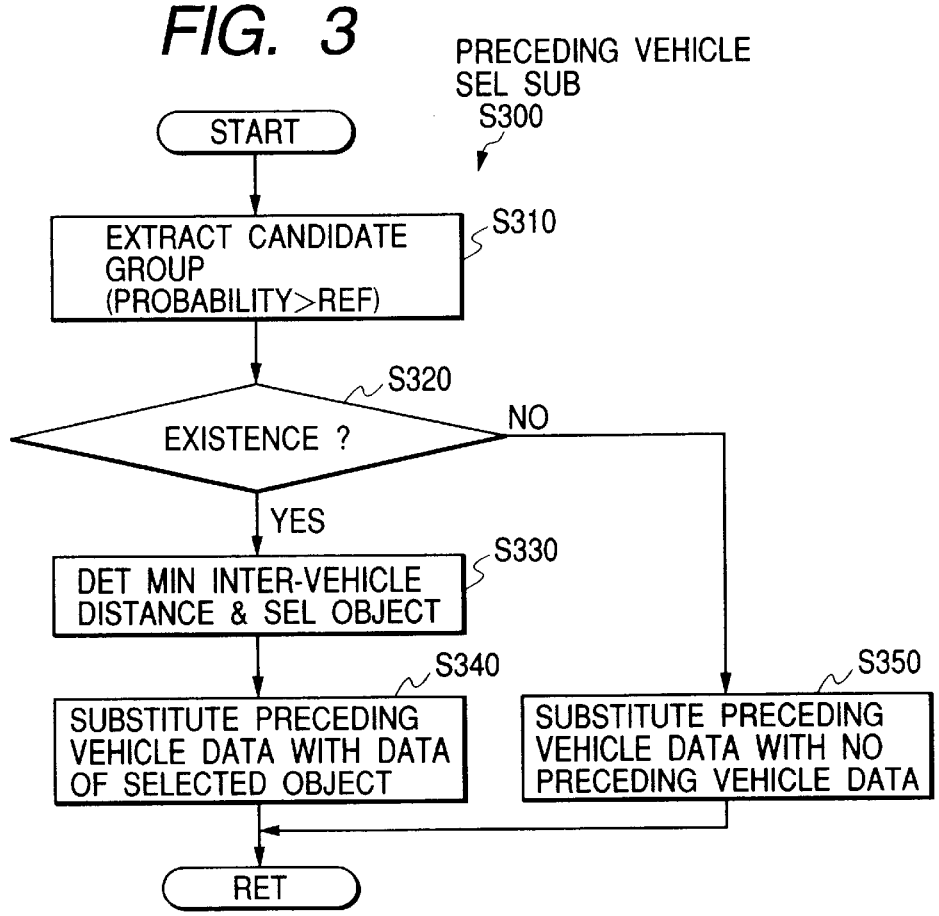

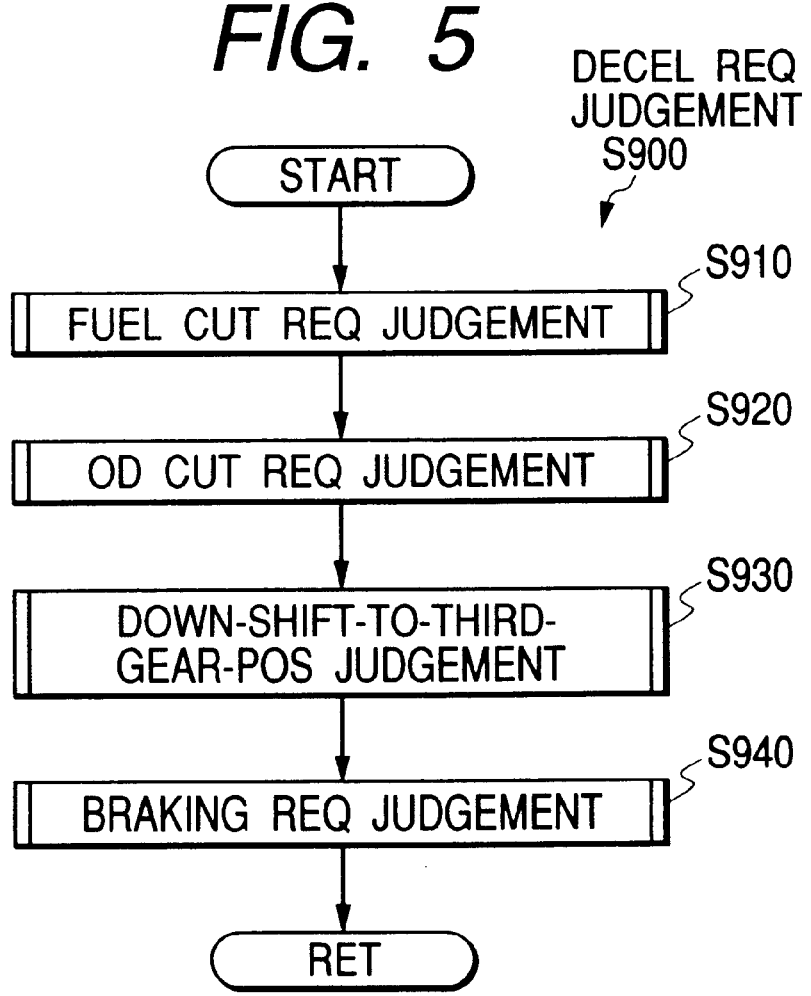

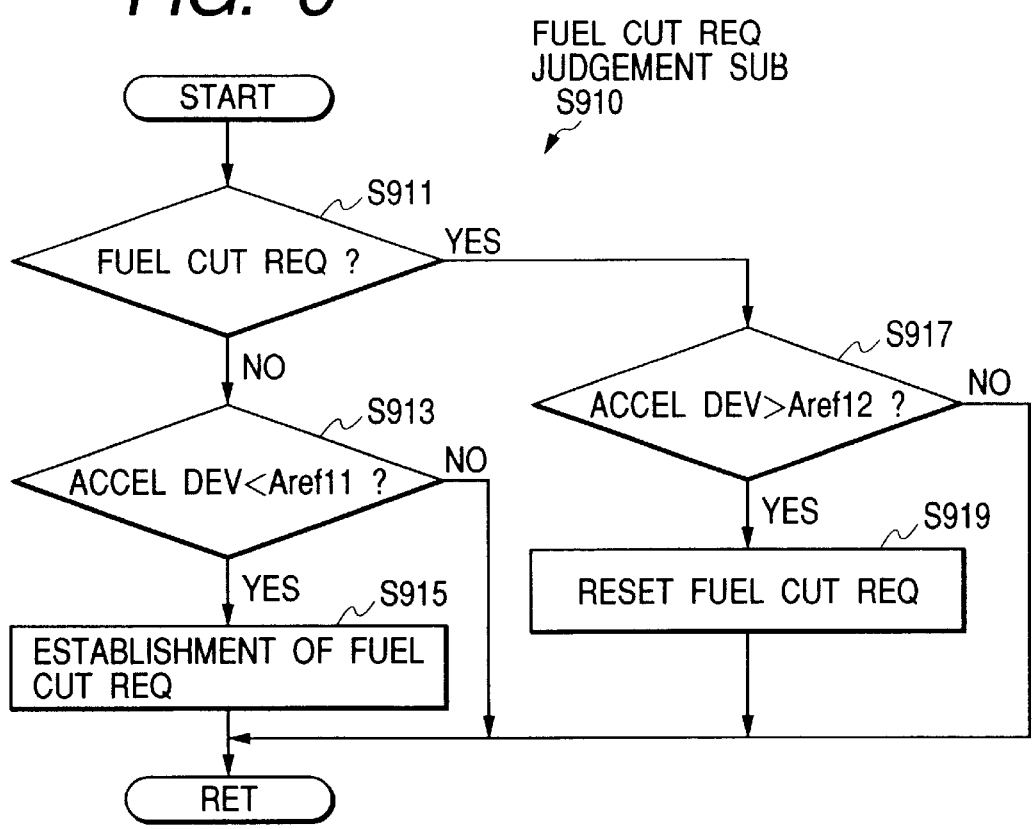

INTER-VEHICLE DISTANCE CONTROL APPARATUS AND A RECORDING MEDIUM FOR THE SAME

BACKGROUND OF THE INVENTION

1. Field of the Invention

This invention relates to an inter-vehicle distance control apparatus and a recording medium for controlling an inter-vehicle distance apparatus.

2. Description of the Prior Art

Inter-vehicle distance controlling apparatuses for controlling an inter-vehicle distance (a distance between this vehicle and the preceding vehicle traveling on the same lane in the same traveling direction) to automatically track the preceding vehicle are known. Tracking is performed by controlling the acceleration and deceleration units to reduce difference between the actual inter-vehicle distance and the target inter-vehicle distance, that is, an inter-vehicle distance deviation. If the mechanisms relating the acceleration or deceleration are out of order, generally, the inter-vehicle distance control is disabled. For example, Japanese Patent application provisional publication No. 10-16900 discloses that controlling is inhibited when an error is detected in the transmission which acts as a deceleration mechanism, such as engine-braking by down-shifting. However, the error in the deceleration mechanism may be temporary.

SUMMARY OF THE INVENTION

The aim of the present invention is to provide a superior inter-vehicle distance control apparatus and a superior recording medium for controlling inter-vehicle distance apparatus.

According to the present invention, a first aspect of the present invention provides an inter-vehicle distance control apparatus for a vehicle comprising: acceleration means for accelerating said vehicle; deceleration means for decelerating said vehicle; inter-vehicle distance control means for calculating an inter-vehicle distance control amount in accordance with an inter-vehicle distance deviation and a relative velocity between said vehicle and said preceding vehicle and controlling said acceleration and deceleration means in accordance with the calculated inter-vehicle distance control amount to travel said vehicle to track the preceding vehicle, said inter-vehicle deviation being difference between an actual inter-vehicle distance physical amount and a target inter-vehicle distance physical amount, said actual inter-vehicle distance physical amount corresponding to an actual inter-vehicle distance between said vehicle and the preceding vehicle, said target inter-vehicle distance physical amount corresponding to a target inter-vehicle distance between said vehicle and the preceding vehicle; judging means for judging whether said deceleration means is in a temporarily unusable condition of said deceleration means, said temporarily unusable condition being that said deceleration means is now unusable due to a known cause but will be usable again in the near future; and control means responsive to said inter-vehicle distance control means and said judging means for judging that it is necessary to drive said deceleration means by said inter-vehicle distance control means and continuing control by said inter-vehicle control means when it is judged that it is necessary to drive said deceleration means by said inter-vehicle distance control means and said judging means judges that said deceleration means is in the temporarily unusable condition.

According to the present invention, the second aspect provides an inter-vehicle distance control apparatus based on the first aspect, further comprising informing means for informing a driver of data when said judging means judges that said deceleration means is in said temporary unusable condition and said operation of said deceleration means is required by said inter-vehicle distance control means.

According to the present invention, the third aspect provides an inter-vehicle distance control apparatus based on the first aspect, further comprising: acceleration side judging means for judging whether said acceleration means is in an acceleration temporarily unusable condition; and acceleration control means responsive to said inter-vehicle distance control means and said acceleration side judging means for judging that it is necessary to drive said acceleration means by said inter-vehicle control means and operating said inter-vehicle control means to continue controlling by said inter-vehicle control means when it is judged that it is necessary to drive said acceleration means by said inter-vehicle control means and said judging means judges that said acceleration means is in the temporarily unusable condition.

According to the present invention, the fourth aspect provides an inter-vehicle distance control apparatus based on the second aspect, wherein said informing means informs said driver of alarm data when said actual inter-vehicle distance is shorter than a predetermined alarming distance.

According to the present invention, the fifth aspect provides an inter-vehicle distance control apparatus based on the fourth aspect, wherein said data is equal to said alarm data.

According to the present invention, the sixth aspect provides an inter-vehicle distance control apparatus based on the first aspect, wherein said deceleration means includes an actuator having a rating for controlling a brake pressure, said rating defining the maximum continuously operating interval, said inter-vehicle distance control apparatus further comprising detection means for detecting a continuously operating interval of said actuator, and said judging means judges that said deceleration means is in said temporarily unusable condition when said continuously operation interval reaches said maximum continuously operation interval.

According to the present invention, the seventh aspect provides a recording medium storing program data readable by a computer in an inter-vehicle distance control apparatus comprising: acceleration means for accelerating said vehicle; deceleration means for decelerating said vehicle; inter-vehicle distance control means for calculating an inter-vehicle distance control amount in accordance with an inter-vehicle distance deviation and a relative velocity between said vehicle and said preceding vehicle and controlling said acceleration and deceleration means in accordance with the calculated inter-vehicle distance control amount to travel said vehicle to track the preceding vehicle, said inter-vehicle deviation being difference between an actual inter-vehicle distance physical amount and a target inter-vehicle distance physical amount, said actual inter-vehicle distance physical amount corresponding to an actual inter-vehicle distance between said vehicle and the preceding vehicle, said target inter-vehicle distance physical amount corresponding to a target inter-vehicle distance between said vehicle and the preceding vehicle; judging means for judging whether said deceleration means is in a temporarily unusable condition of said deceleration means, said temporarily unusable condition being that said deceleration means is now unusable due to a known cause but will be usable again in the near future; control means responsive to said inter-vehicle distance control means and said judging means for judging that it is necessary to drive said deceleration means by said inter-vehicle control means and operating said inter-vehicle control means to continue controlling by said inter-vehicle control means when it is judged that it is necessary to drive said deceleration means by said inter-vehicle control means and said judging means judges that said deceleration means is in the temporarily unusable condition.

According to the present invention, an eighth aspect provides an inter-vehicle distance control apparatus for a vehicle comprising: acceleration means for accelerating said vehicle; deceleration means for decelerating said vehicle; inter-vehicle distance control means for calculating an inter-vehicle distance control amount in accordance with an inter-vehicle distance deviation and a relative velocity between said vehicle and said preceding vehicle and controlling said acceleration and deceleration means in accordance with the calculated inter-vehicle distance control amount to travel said vehicle to track the preceding vehicle, said inter-vehicle deviation being difference between an actual inter-vehicle distance physical amount and a target inter-vehicle distance physical amount, said actual inter-vehicle distance physical amount corresponding to an actual inter-vehicle distance between said vehicle and the preceding vehicle, said target inter-vehicle distance physical amount corresponding to a target inter-vehicle distance between said vehicle and the preceding vehicle; detection means for detecting condition of said deceleration means; judging means for judging whether said deceleration means is in a permanently unusable condition or a continuing condition in accordance with the detected condition, said continuing condition including a temporary unusable condition and a normal condition of said deceleration means; and control means for stopping control by said inter-vehicle distance control means when said judging means judges that said deceleration means is in said permanently unusable condition and operation of said deceleration means is required by said inter-vehicle distance control means and continuing said control by said inter-vehicle distance control means when said second judging means judges that said deceleration means is in said continuing condition and said operation of said deceleration means is required by said inter-vehicle distance control means.

According to the present invention, a ninth aspect provides an inter-vehicle distance control apparatus based on the eighth aspect further comprising: acceleration side judging means for judging whether said acceleration means is in a permanently unusable condition or a continuing condition in accordance with the detected third condition, said continuing condition of said acceleration means including a temporary unusable condition and a normal condition of said acceleration means; and acceleration control means for stopping control by said inter-vehicle distance control means when said acceleration side judging means judges that said acceleration means is in said permanently unusable condition and operation of said acceleration means is required by said inter-vehicle distance control means and continuing said control by said inter-vehicle distance control means when said acceleration side judging means judges that said acceleration means is in said temporary unusable condition and said operation of said acceleration means is required by said inter-vehicle distance control means, wherein said control means and said acceleration control means effect common operations between when said judging means judges that said deceleration means is in said temporary unusable condition and said operation of said deceleration means is required by said inter-vehicle distance control means and when said acceleration side judging means judges that said acceleration means is in said temporary unusable condition and said operation of said acceleration means is required by said inter-vehicle distance control means.

BRIEF DESCRIPTION OF THE DRAWINGS

The object and features of the present invention will become more readily apparent from the following detailed description taken in conjunction with the accompanying drawings in which:

FIG. 2 depicts a flow chart showing the main routine executed by the inter-vehicle distance control ECU shown in FIG. 1;

FIG. 3 depicts a flow chart of the preceding vehicle selection subroutine shown in FIG. 2;

FIG. 5 depicts a flow chart of the deceleration request judging subroutine shown in FIG. 2;

FIG. 6 depicts a flow chart of the fuel cut request judging subroutine shown in FIG. 5;

The same or corresponding elements or parts are designated with like references throughout the drawings.

DETAILED DESCRIPTION OF THE INVENTION

<First Embodiment>

Figure 1:
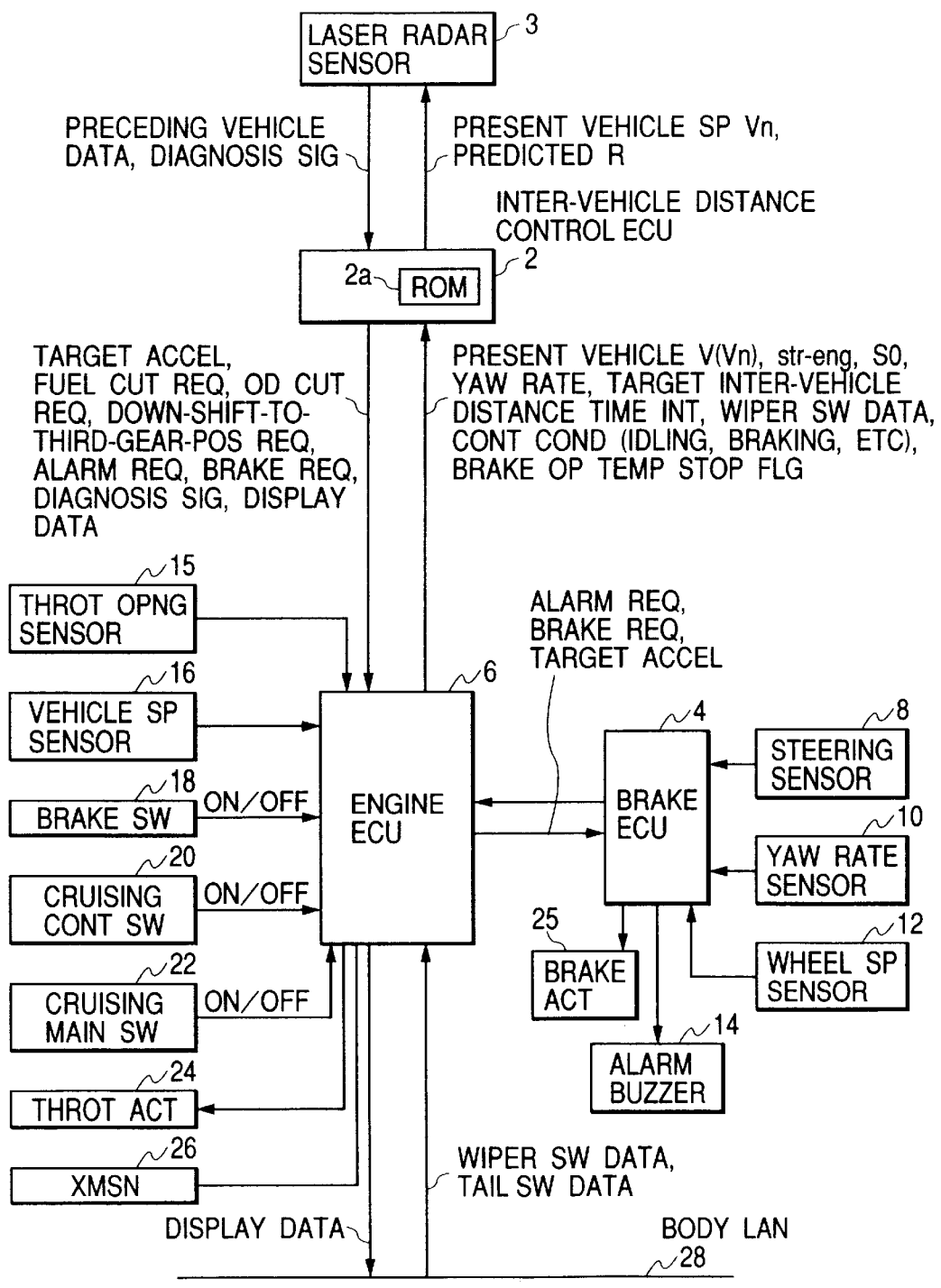
FIG. 1 is a block diagram of control circuits mounted in a vehicle according to first and second embodiments.

FIG. 1 is a block diagram of control circuits mounted in a vehicle, including an inter-vehicle distance control electronic control unit 2 (hereinafter referred to as inter-vehicle distance control ECU) 2 and a brake electronic control unit 4 (hereinafter referred to as a brake ECU).

The inter-vehicle distance control ECU 2 includes a microprocessor, interface circuits, etc. and receives a present vehicle velocity (Vn) signal, a steering angel signal (str-eng, S0) signal, a yew rate signal, a target inter-vehicle time interval signal, a wiper switch data, control condition signals such as idling control or a braking control, braking temporary stop flag or the like from an engine electronic control unit 6 (hereinafter referred to as engine ECU). The inter-vehicle distance control ECU 2 effects inter-vehicle control operations or inter-vehicle alarm operation in accordance with the received data.

A laser radar sensor 3 mainly includes a scanning distance measuring units with a laser beam and a microprocessor. The scanning distance measuring unit calculates a probability that the preceding vehicle travels on the same lane as this vehicle as one of functions thereof in accordance with an angle between the forward direction of this vehicle and the preceding vehicle and a distance between the preceding and this vehicles detected by the scanning distance measuring unit and the present vehicle velocity (Vn) signal and a radius R of a curvature or the like received form the inter-vehicle distance control ECU 2. The laser radar sensor 3 transmits the preceding vehicle data including the probability and the relative velocity or the like to the inter-vehicle distance control ECU 2. Moreover, the laser radar sensor 3 transmits a diagnosis signal of the laser radar sensor 3 itself to the inter-vehicle distance control ECU 2.

The scanning distance measuring unit emits a radar radio wave beam or a laser beam within a predetermined angel range in the width direction of the vehicle to measure the distance between the preceding vehicle and this vehicle on the basis of the reflected wave or the reflected laser beam from the object.

Moreover, the inter-vehicle distance control ECU 2 determines the preceding vehicle to which the inter-vehicle distance control is subjected in accordance with the portability included in the preceding vehicle data received from the laser radar sensor 3 and transmits a target acceleration signal, a fuel cut requesting signal, an OD cut requesting signal, a down-shift-to-third-gear-position requesting signal (flag), and a braking requesting signal (flag) to the engine ECU 6. Further, the inter-vehicle distance control ECU 2 judges that an alarm is generated to transmit an alarm sounding request signal (flag) or an alarm sound stop requesting signal (flag). Moreover, the inter-vehicle distance control ECU 2 transmits the diagnosis signal, a display data signal, or the like.

The brake ECU 4 mainly includes a microprocessor and obtains the steering angle and the yaw rate from the steering sensor 8 for detecting the steering angle of the vehicle, the yew rate sensor 10 for detecting the yew rate to detect turning of the vehicle, and a wheel velocity sensor 12 for detecting speeds of respective wheels and transits these data to the inter-vehicle distance control ECU 2 via the engine ECU 6. Moreover, the brake ECU 4 controls a brake actuator 25 by effecting duty-controlling to opening and closing a pressure increasing valve and a pressure deceasing control valve equipped in the brake hydraulic circuit to control the braking force.

Further, the brake ECU 4 sounds an alarm buzzer 14 in response to the alarm requesting signal (flag) from the inter-vehicle distance control ECU 2 via the engine ECU 6.

Moreover, the brake ECU 4 generates and transmits a braking operation temporarily stopping flag to the engine ECU 6. The braking operation temporarily stopping flag indicates that the brake actuator 25 is temporarily in an unusable condition. That is, because of heat generated in the pressure increasing control valve and the pressure decreasing control valve equipped in the break hydraulic circuit, there is a limitation in continuously supplying power to the valve. Then, if the continuous operating interval exceeds the maximum continuous operating interval, i.e. rating, it is necessary to temporarily stop supplying the power to the pressure increasing or decreasing valve, though the valve is not out of order. In this case, the brake ECU 4 generates the brake operation temporary stopping flag and transmits it to the engine ECU 6 because it will normally operate again after a predetermined time interval.

The engine ECU 6 mainly includes a microprocessor and receives detecting signals from a throttle opening angle sensor 15, a velocity sensor 16 for detecting a velocity of the vehicle, a brake switch 18 for detecting whether or not the brake pedal is depressed, a cruising control switch 20, a cruising main switch 22, and other sensors or switches and wiper switch data or a tail switch data through a body LAN 28. Moreover, the engine ECU 6 receives, from the brake ECU 4, the steering angle (str-eng, S0) signal, the yew rate signal, the braking operation temporarily stopping flag and the above-mentioned braking operation temporarily stopping flag, and further receives, from the inter-vehicle distance control ECU 2, a target acceleration signal, a fuel cut requesting signal (flag), an OD cut requesting signal (flag), the down-shift-to-third-position requesting signal (flag), a braking requesting signal (flag), an alarm requesting signal (flag), the diagnosis signal, and display data signal or the like.

The engine ECU 6 transmits drive commands to the throttle actuator 24 for adjusting the throttle angle of the internal combustion engine (here, gasoline engine) and an actuator driving unit of the transmission 26 in accordance with the running condition judged from the received signals. These actuators control the output of the internal combustion engine, the braking force, and gear shifting. In this embodiment, the transmission 26 is of five-gear-position automatic transmission, wherein the reduction gear ratio of the fourth gear position is set to 1 and the reduction gear ratio of the fifth gear position is set to a smaller value (for example, 0.7) than 1. This is so called four-gear-position-plus-over-drive structure. Thus, if the above-mentioned OD cut requesting signal is outputted, when the transmission 26 is in the fifth gear position, that is, the over-drive shift position, the gear is shifted to fourth gear position. If the transmission 26 is in the fourth gear position, the gear is shafted to the third gear potion. As a result, the gear shifting generates a large braking force, so that the vehicle is decelerated with the engine braking.

Moreover, the engine ECU 6 transmits necessary display data to display units (not shown) such as LCD mounted on a dash board through the body LAN 28 to display the necessary display information. The engine ECU 6 further transmits the present vehicle velocity (Vn) signal, the steering angle (str-eng, S0) signal, the yew rate signal, the target inter-vehicle distance time interval signal, a wiper switch data signal, control condition signals such as the idling controlling or the braking control, and the braking operation temporarily stopping flag transmitted from the brake ECU 4 to the inter-vehicle distance control ECU 2.

FIG. 2 depicts a flow chart showing the main routine executed by the inter-vehicle distance control ECU 2. In the first step S100, the inter-vehicle distance control ECU 2 receives laser radar data such as data regarding the preceding vehicle from the laser radar sensor 3. In the following step S200, the inter-vehicle distance control ECU 2 receives the engine ECU data such as the present vehicle velocity (Vn) or the target inter-vehicle distance time interval from the engine ECU 6.

On the basis of the received data, the inter-vehicle distance control ECU 2 executes processes of the preceding vehicle selection (S300), a target acceleration operation (S400), a deceleration requesting judgment (S900), and alarm generation judgment (S1000). Details of respective processes will be described later.

Next, the inter-vehicle distance control ECU 2 executes predicted R operation in step S1100 and transits the laser radar data such as the present vehicle velocity (Vn) and the predicted R to the laser radar sensor 3 in step S1200. In the following step S1300, the inter-vehicle distance control ECU 2 transmits the engine ECU data such as the target acceleration, the fuel cut request flag, the OD cut request flag, the down-shift-to-third-gear-position flag, the braking request flag, the alarm request flag, or the like to the engine ECU 6.

Next, subroutines S300, S400, S900, and S1000 will be described.

At first, the subroutine of the preceding vehicle selection in step S300 will be described with reference to FIG. 3. FIG. 3 depicts a flow chart of the preceding vehicle selection subroutine shown in FIG. 2.

In the fist step S310, the inter-vehicle distance control ECU 2 extracts a candidate preceding vehicle group of target objects. In this process, the inter-vehicle distance control ECU 2 extracts target objects of which palatability of the same lane are greater than a predetermined value from all target objects of which data is received from the laser radar sensor 3. Here, the probability of the same lane is the palatability that each target object exists on the predicted lane on which this vehicle travels and is operated by the laser radar sensor 3 and transmitted to the inter-vehicle distance control ECU 2 as a portion of the target object data.

In the following step S320, the inter-vehicle distance control ECU 2 judges whether there is a candidate of a preceding vehicle (existence of the candidate). If there is no candidate of a preceding vehicle in step S320, the inter-vehicle distance control ECU 2 sets data when no preceding vehicle is detected as the preceding vehicle data in step S350 as the preceding data and processing ends. That is, the inter-vehicle distance control ECU 2 substitutes the preceding vehicle data with no preceding vehicle data in step S350. On the other hand, if there is a candidate of a preceding vehicle in step S320, processing proceeds to step S330 and inter-vehicle distance control ECU 2 selects (determine) one of the target objects of which inter-vehicle distance is shortest, as the preceding vehicle. Next, in step S340, the inter-vehicle distance control ECU 2 sets the data of the selected target object selected in step S330 as the preceding vehicle data, that is, the inter-vehicle distance control ECU 2 substitutes the preceding data with the data of the selected object, and ends processing in this subroutine.

Figure 4A:
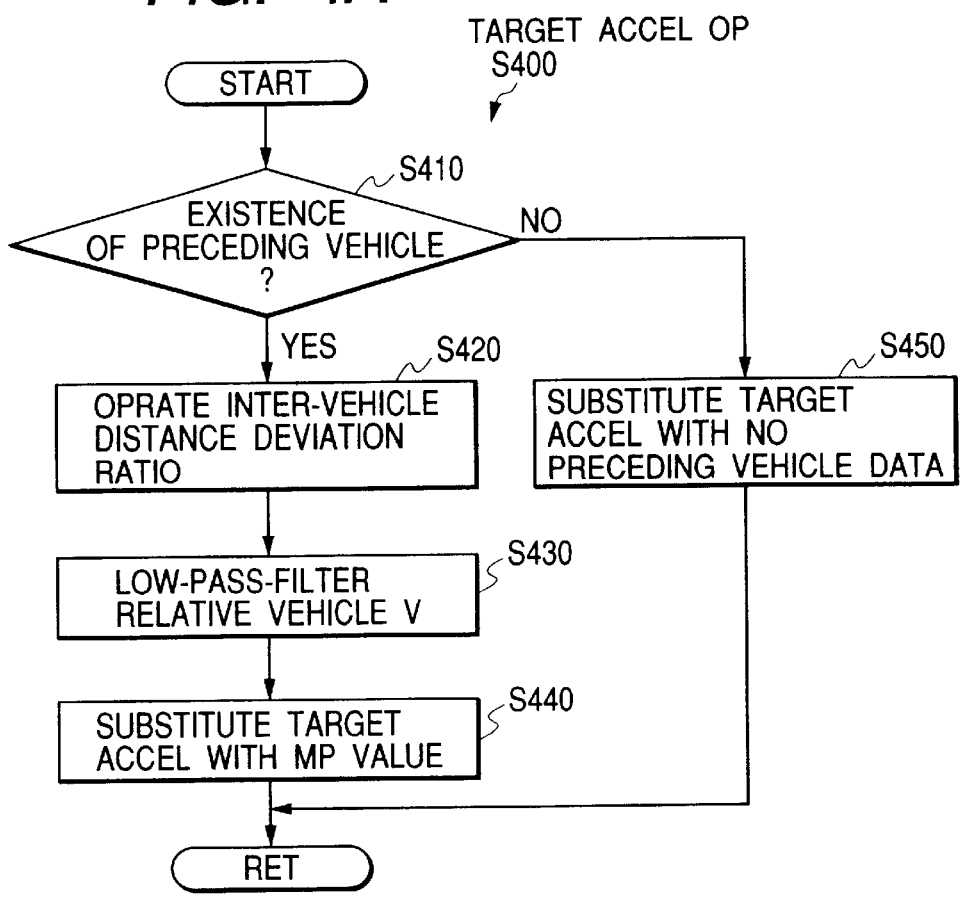
FIG. 4A depicts a flow chart of the subroutine of the target acceleration operation shown in FIG. 2.

FIG. 4A depicts a flow chart of the subroutine of the target acceleration operation.

In the first step S410, the inter-vehicle distance control ECU 2 judges whether a preceding vehicle has been detected (determined). If a preceding vehicle has been detected (existence of a preceding vehicle), the inter-vehicle distance control ECU 2 calculates an inter-vehicle distance deviation ratio. This inter-vehicle distance deviation ratio (IVDR) [%] is obtained by subtracting the target inter-vehicle distance from the present inter-vehicle distance and the result is divided by the target inter-vehicle distance and the result is multiplied by 100. Here, the target inter-vehicle distance is varied in accordance with the vehicle velocity to match it to the sense of a driver.

Figure 4B:
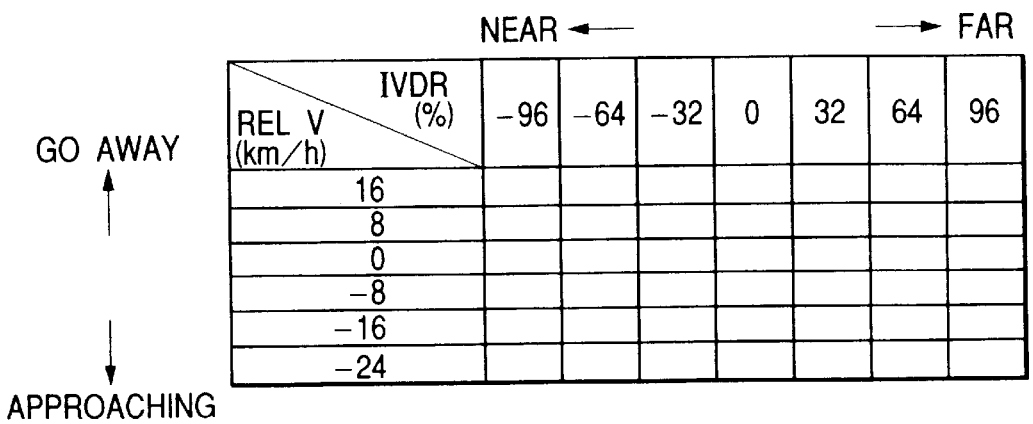
FIG. 4B is a target acceleration control map used in the target acceleration operation.

In the following step S430, the inter-vehicle distance control ECU 2 low-pass-filters the relative vehicle velocity. After the inter-vehicle distance deviation ratio and the relative velocity have been obtained in steps S420 and S430, the inter-vehicle distance control ECU 2 obtains a target acceleration with reference to the control map shown in FIG. 4B in accordance with these parameters (inter-vehicle distance deviation ratio and the relative velocity).

In this control map, there are seven values of −96, −64, −32, 0, 32, 64, and 96 as the inter-vehicle distance deviation ratio (%) and six values of 16, 8, 0, −8 −16, and −24 as the relative vehicle velocity (Km/h). The value not shown in the control map within the ranges of the map is linear-interpolated. The value not shown in the control map outside the ranges of the map, the upper or lower limit in the control map that is nearer the value is used. Moreover, if the value in the control map is used, an upper or lower limit may be provided.

On the other hand, if a preceding vehicle has not been detected, in step S410, the value when no preceding vehicle is detected is set as the target acceleration in step S450.

Next, the deceleration request judging subroutine S900 will be described with reference to the flow chart in FIG. 5.

In this deceleration request judgment, the fuel cut request judgment (S910), the OD cut request judgment (S920), the down-shift-to-third-gear-position (S930), and the braking request judgment (S940) are successively executed and processing ends.

The fuel cut request judging subroutine S910 will be described with reference to the flow chart in FIG. 6.

In the first step S911, the inter-vehicle distance control ECU 2 judges whether the fuel cut is being requested, that is, the fuel cut flag has been set. If the fuel cut flag has not been set, the inter-vehicle distance control ECU 2 judges whether the acceleration deviation is lower than a reference value Aref11 in step S913. Here, the acceleration deviation is the value calculated by subtracting the actual acceleration from the target acceleration. If the acceleration deviation<Aref11 in step S913, the inter-vehicle ECU 2 judges that the fuel cut request is established and the inter-vehicle distance control ECU 2 sets the fuel cut request flag and processing ends. If the acceleration deviation≧Aref11 in step S913, processing returns to the deceleration request judgment subroutine.

On the other hand, if the fuel cut is being requested in step S911, that is, the fuel cut request flag has been set, processing proceeds to step S917 and the inter-vehicle distance control ECU 2 judges whether the acceleration deviation is greater than a reference value Aref12. If the acceleration deviation>Aref12 in step S917, the inter-vehicle distance control ECU 2 releases the fuel cut request, that is, resets the fuel cut request flag, in step S919 and the processing in this subroutine ends. If the acceleration deviation≦Aref12 in steep S917, processing in this subroutine ends.

Figure 7:
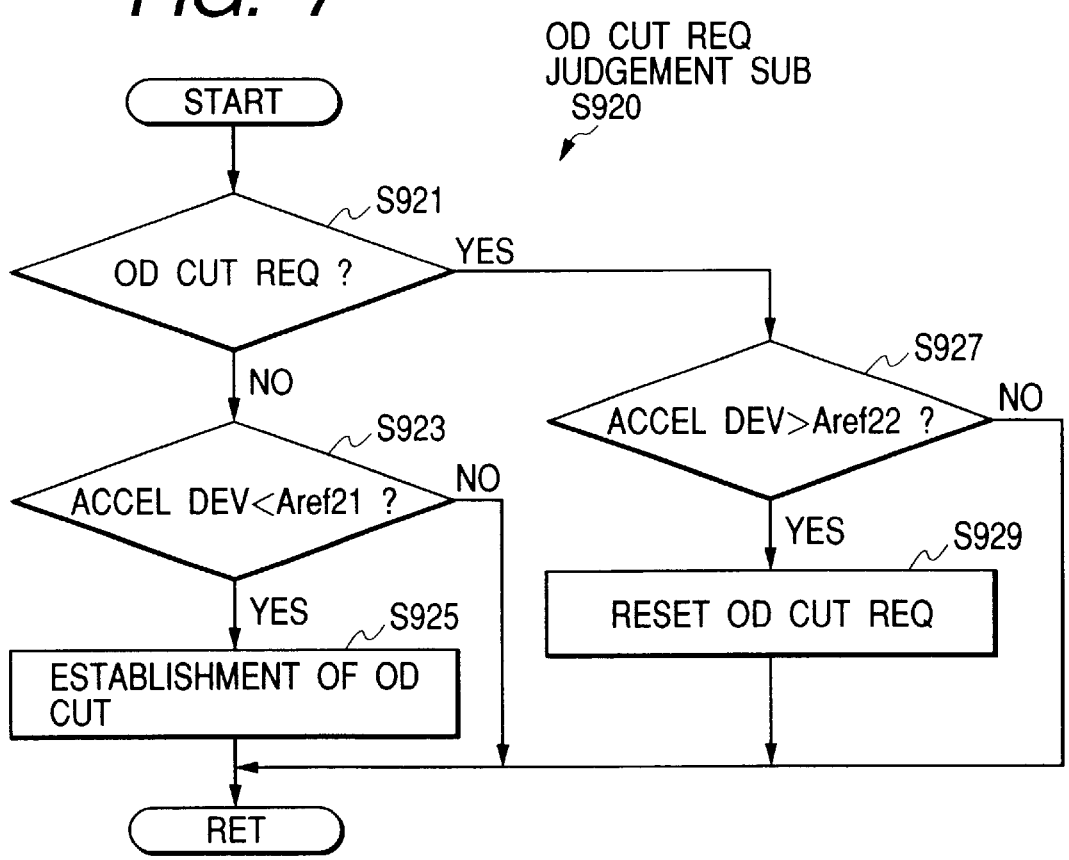
FIG. 7 depicts a flow chart of the over driving cut request judging subroutine shown in FIG. 5.

Next, the OD cut request judging subroutine in Step S920 will be described with reference to the flow chart in FIG. 7.

In the first step S921, the inter-vehicle distance control ECU 2 judges whether the OD cut is being requested, that is, the OD cut request flag has been set. If the OD cut is not being requested in step S921, the inter-vehicle distance control ECU 2 judges whether the acceleration deviation is lower than a reference value Aref21 in step S923. If the acceleration deviation<Aref21 in step S923, the inter-vehicle distance control ECU 2 judges that the OD cut request has been established in step S925 and the processing returns to the deceleration request subroutine. If the acceleration deviation≧Aref21 in steep S923, processing in this subroutine ends and returns to the deceleration request subroutine.

On the other hand, if the OD cut is being requested, that is, the OD cut flag has been set in step S921, processing proceeds to step S927, the inter-vehicle distance control ECU 2 judges whether the acceleration deviation is greater than a reference Aref22 in step S927. If the acceleration deviation>the reference Aref22 in step S927, the inter-vehicle distance control ECU 2 releases or cancels the OD cut request in step S929, that is, resets the OD cut request flag, and processing in this subroutine ends and returns to the deceleration request subroutine.

If the acceleration deviation≦the reference Aref22 in step S927, the inter-vehicle distance control ECU 2 directly ends processing in this subroutine and processing returns to the main routine.

Figure 8:
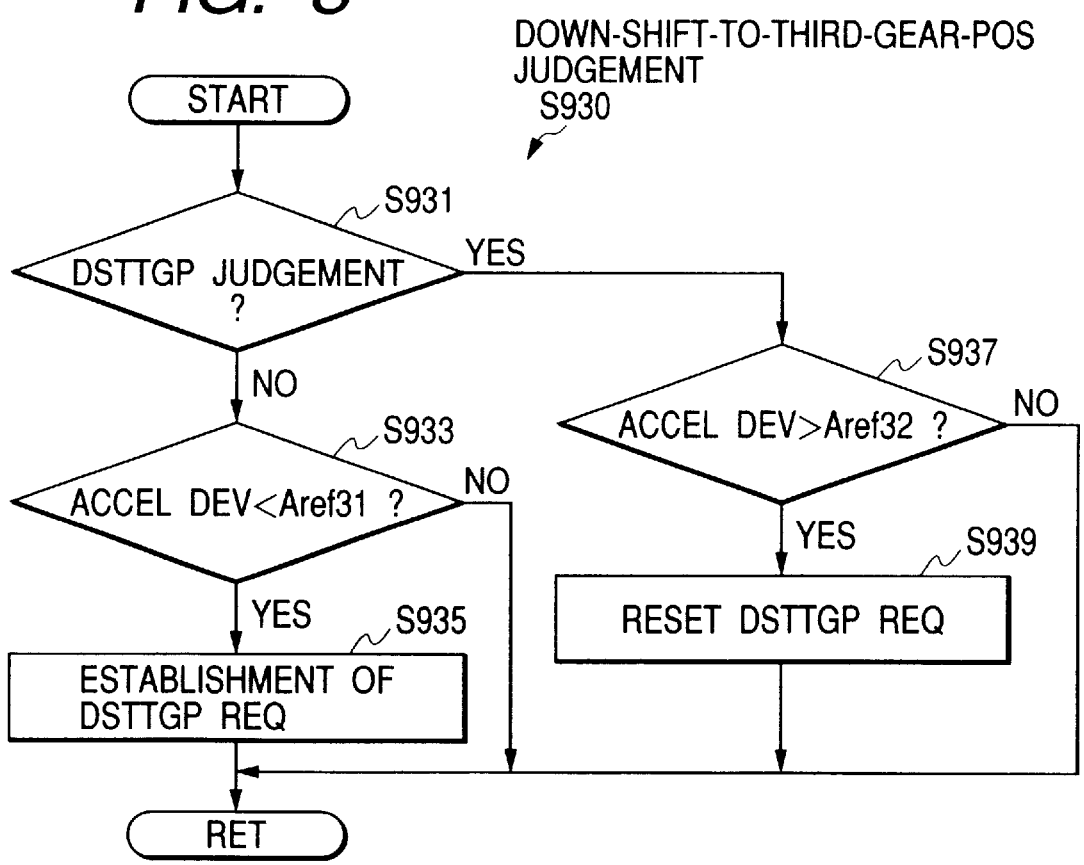
FIG. 8 depicts a flow chart of the down-shifting-to-third-gear-position request judging subroutine shown in FIG. 5.

FIG. 8 depicts a flow chart of the down-shift-to-third-gear-position (DSTTGP) subroutine S930.

In step S931, the inter-vehicle distance control ECU 2 judges whether the down-shift-to-third-gear-position is being requested, that is, judges whether the down-shift-to-third-gear-position flag has been set. If the down-shifting-to-third-gear-position is not being requested in step S931, the inter-vehicle distance control ECU 2 judges whether the acceleration deviation is lower than a reference value Aref31 in step S933. If the acceleration deviation<Aref31, that is, the answer in S933 is YES, the inter-vehicle distance control ECU 2 judges that the down-shift-to-third-gear-position has been established and sets the down-shift-to-third-gear-position flag and processing in this subroutine ends and returns to the deceleration request subroutine. If the acceleration deviation≧Aref31 in step S933, that is, if the answer in step S933 is No, processing in this subroutine directly returns to the deceleration request subroutine.

If the down-shift-to-third-gear-position request flag has been set in step S931, the inter-vehicle distance control ECU 2 judges whether the acceleration deviation is greater than a reference value Aref32 in step S937. If the acceleration deviation>Aref32 in step S937, the inter-vehicle distance control ECU 2 release the down-shift-to-third-gear-position request, that is, resets the down-shift-to-third-gear-position flag in step S939 and processing returns to the deceleration request subroutine.

Figure 9:
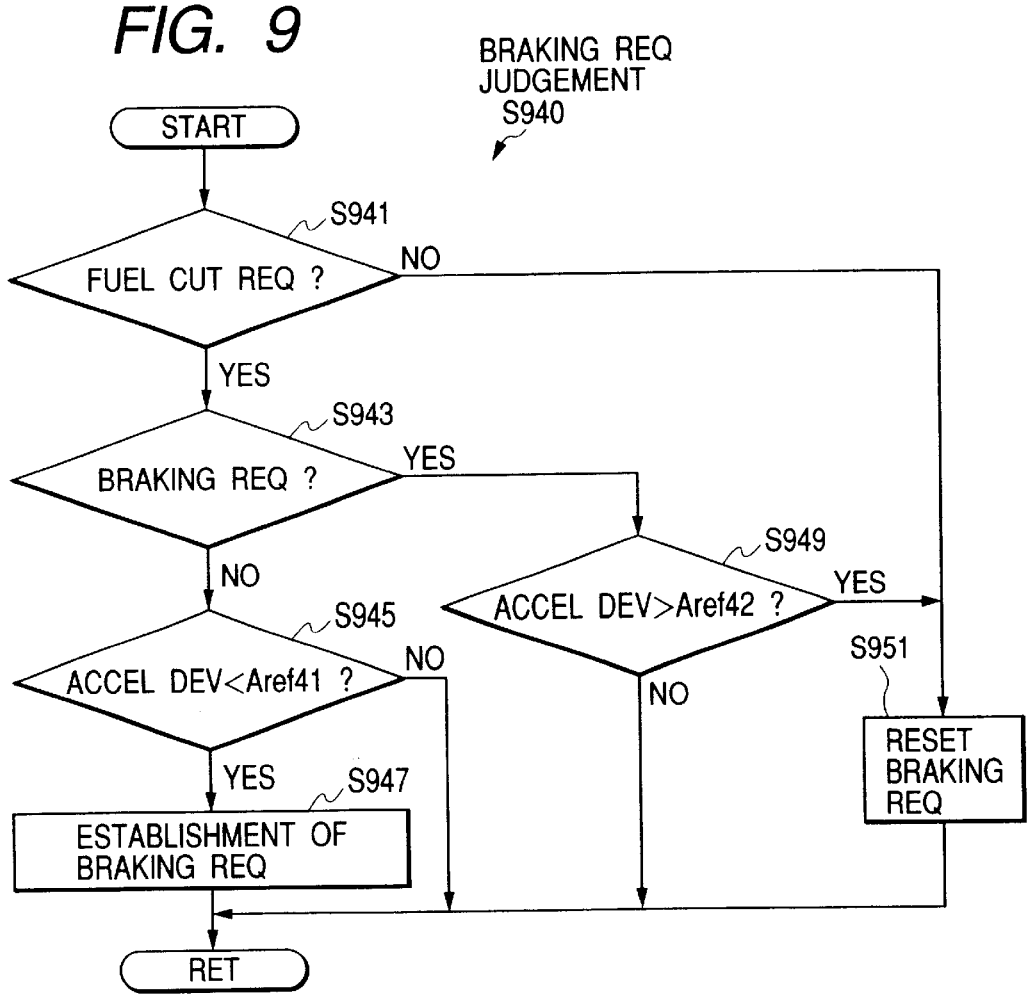
FIG. 9 depicts a flow chart of the brake request judging subroutine shown in FIG. 5.

FIG. 9 depicts a flow chart of the braking request judging subroutine S940.

In step S941, the inter-vehicle distance control ECU 2 judges whether fuel cut is being requested, that is, judges whether the fuel cut request flag has been set. If the fuel cut is not being requested, that is, if the fuel cut request flag has not been set, the inter-vehicle distance control ECU 2 releases (cancels) the braking request, that is, the inter-vehicle distance control ECU 2 resets the braking request flag in step S951 and processing returns to the deceleration request subroutine.

On the other hand, if the fuel cut is being requested, that is, the fuel cut requesting flag is set in step S 941 is YES, the inter-vehicle distance control ECU 2 judges whether the braking is being requested, that is, the braking flag has been set in step S943. If the braking is not being requested, that is, the braking request flag has not been set in step S943, the inter-vehicle distance control ECU 2 judges whether the acceleration deviation is lower than a reference value Aref41 in step S945. If the acceleration deviation<Aref41, that is, if the answer in step S945 is YES, the inter-vehicle distance control ECU 2 judges that the braking request is established in step S947, that is, the inter-vehicle distance control ECU 2 sets the brake request flag in step S947 and processing returns to the deceleration request judging subroutine S900.

If the acceleration deviations≧Aref41, that is, if the answer in step S945 is NO, processing returns to the deceleration subroutine S900.

If the braking is being requested, that is, the braking flag is set in step S943 (S943: YES), processing proceeds to step S949, the inter-vehicle distance control ECU 2 judges whether the acceleration deviation is greater than a reference value Aref42. If the acceleration deviation>the reference value Aref42 (S949: YES), the inter-vehicle distance control ECU 2 releases the braking request, that is, the inter-vehicle distance control ECU 2 resets the braking request flag in step S951 and finishes processing of this subroutine. If the acceleration deviation≦the reference value Aref42 (S949: NO), the inter-vehicle distance control ECU 2 directly returns to the deceleration request judgment subroutine S900.

In step s941, if the fuel cut request flag has not been set, the inter-vehicle distance control ECU 2 resets the braking request in step S951 and processing returns to the deceleration request judgment subroutine S900.

The reference values Aref12, Aref21, Aref22, Aref31, Aref41, Aref42 used in the flow charts in FIGS. 6 to 9 will be described further. These reference values are as follows:

| deceleration | start threshold | stop threshold |
|---|---|---|
| fuel cut | Aref11 | Aref12 |
| OD cut | Aref21 | Aref22 |
| DSTTGP | Aref31 | Aref32 |
| braking | Aref41 | Aref42 |

The relations between the start and stop thresholds are as follows:

| | start threshold/stop thresholds |
|---|---|
| fuel cut: | Aref11 < Aref12 |
| OD cut: | Aref21 < Aref22 |
| DSTTGP: | Aref31 < Aref32 |
| braking: | Aref41 < Aref42 |

These relations provide hysteresis control to prevent chattering.

The relation of start threshold values among respective decelerations is as follows:

$$0 > Aref11 \geq Aref21 > Aref31 \geq Aref41$$

This relation is provided because it is desired to perform deceleration in order of lower deceleration force.

The relation of stop threshold values among respective deceleration means is as follows:

$$Aref12 \geq Aref22 \geq Aref32 \geq Aref42 > 0$$

This relation is provided because it is desired to release (reset) the deceleration in order of large deceleration force.

Figure 10:
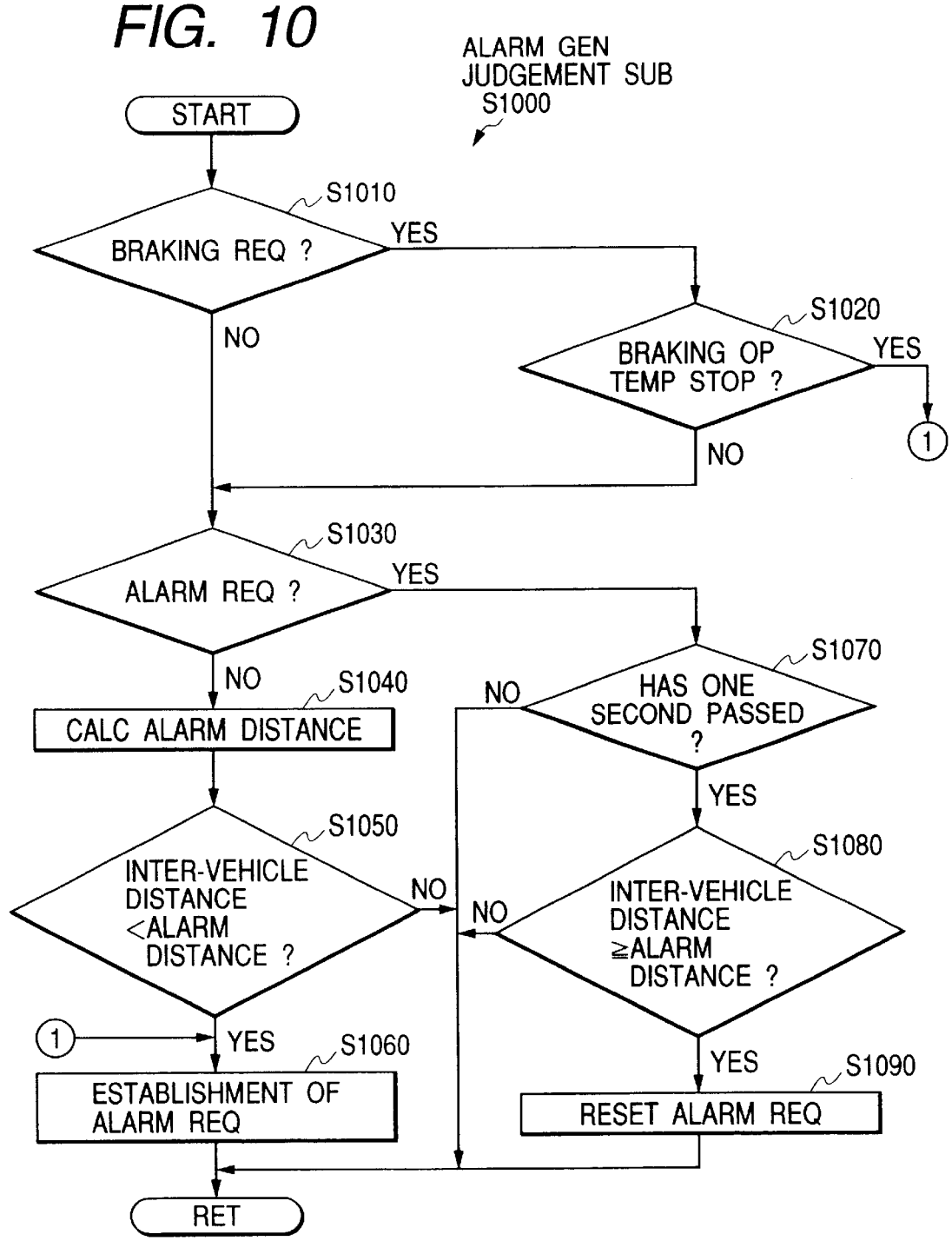
FIG. 10 depicts a flow chart of the alarm generation judging subroutine shown in FIG. 2.

FIG. 10 depicts a flow chart of the alarm generation judgment subroutine S1000.

In step S1010, the inter-vehicle distance control ECU 2 judges whether the braking is being requested, that is, the braking request flag has been set. If the braking is not being requested (S1010: MO), processing proceeds to step S1030 and the inter-vehicle distance control ECU 2 judges whether the alarming is being requested, that is, an alarm requesting flag has been set. If the alarming is not being requested (S1030: NO), the inter-vehicle distance control ECU 2 executes processes in step S1040, S1050, and S1060 including the step of judging whether a predetermined condition is established to command the alarm request.

More specifically, in step S1040, an alarming distance Dw is calculated in accordance with the velocity of this vehicle and the relative velocity.

Alarming distance Dw=f (velocity of this vehicle and relative velocity).

Next, the inter-vehicle distance control ECU 2 judges whether the inter-vehicle distance is shorter than this alarming distance in step S1050. If the inter-vehicle distance is greater than the alarming distance (S1050: NO), processing directly returns to the main routine. If the inter-vehicle distance is shorter than the alarming distance (S1050: YES), the arming request is established, that is, an alarming request flag has been set in step S1060.

On the other hand, in step S1030, if the alarming is being requested (S1030: YES), the alarming request releasing processes for judging whether a predetermined condition is established are executed in steps S1070, S1080, and S1090.

In step S1070, the inter-vehicle distance control ECU 2 judges whether one second has passed after the alarming request has been established. If one second has not passed after the alarming request has been established (S1070: NO), processing directly returns to the main routine. This process is provided to continue the alarming processing for at least one second once the alarming processing is started.

If one second has passed after establishment of alarming request (S1070: YES), the inter-vehicle distance control ECU 2 judges whether the inter-vehicle distance is greater than the alarming distance (S1080). If the inter-vehicle distance is lower than the alarming distance (S1080: NO), processing returns to the main routine. If the inter-vehicle distance is greater than the alarming distance (S1080: YES), the inter-vehicle distance control ECU 2 release the alarming request, that is, the inter-vehicle distance control ECU 2 resets the alarming request flag (S1090).

In step S1060, establishment of the alarming request (alarm request flag) is transmitted to the engine ECU 6 as the engine ECU data as shown in step S1300 in FIG. 2. Then, the engine ECU 6 commands the brake ECU 4 to generation of alarm. In response to this, the brake ECU 4 sounds the alarm buzzer 14.

On the other hand, in step S1090, when the engine ECU 6 receives the releasing the alarm request, the engine ECU 6 stops the alarm buzzer 14 via the brake ECU 4.

The above-mentioned description is provided for the case that braking is not being requested (S1010: No). On the other hand, while braking is requested (S1010: YES), the inter-vehicle distance control ECU 2 judges whether the braking is temporarily stopped.

This judgment is made in accordance with the brake operation temporary stop flag received from the brake ECU 4 through the engine ECU 6. If the brake operation temporary stop flag is set (S1020: YES), that is, braking is being requested and braking is temporarily stopped (S1020: YES), processing proceeds to step S1060, the inter-vehicle distance control ECU 2 establishes the alarm request. That is, the inter-vehicle distance control ECU 2 judges that the alarm request is established without any further judgment.

If the braking is not temporarily stopped (S1020: No), processing proceeds to step S1030 and the inter-vehicle distance control ECU 2 executes the same process as the case that braking is not being requested (S10101: No).

In this embodiment, the inter-vehicle ECU 2 executes process of the inter-vehicle distance controlling, judging, and alarming.

As mentioned above, according to this embodiment, if the brake unit is required to operate (S1010: YES) and the brake unit is in a temporary non-usual condition (S1020: YES), the alarm request is established (S1060) to execute the alarm process to the driver. However, the inter-vehicle distance control itself is continued. Thus, this alarm process informs the driver of the condition that the brake unit temporarily is being not operated but it will be operated in the near future as usual again to restart the inter-vehicle distance control. Thus, if the driver considers that this condition is a problem, the driver can cancels the inter-vehicle control itself at will. On the other hand, the driver can leave this condition as it is, if the driver considers that it is not necessary to cancel the inter-vehicle distance control because the driver knows that the deceleration does not temporarily operate and will operate in the near future as usual.

That is, if it is in the temporary unusable condition, that is, the brake operation temporary stop flag is set, alarming of this condition is informed to the driver to leave the countermeasure to the driver to continue the inter-vehicle distance control with safety driving, so that convenient driving operation is provided.

In the above-mentioned embodiment, the target acceleration is used as the inter-vehicle distance control amount. However, other amounts such as an acceleration deviation (target acceleration—the actual acceleration), a target torque or a target relative velocity can be used as the inter-vehicle distance control amount.

The deceleration is provided by variable methods. For example, (including those described in the above-mentioned embodiment), the adjustment of the braking pressure in the brake unit, the cutting of the fuel to the engine, the over drive cut controlling for inhibiting the over drive gear position, the down-shifting controlling for down shifting the drive gear position, the ignition timing retarding controlling for retarding the ignition timing of the engine, the rocking up controlling for making a torque converter in an automatic transmission into a rock-up condition, and the exhaust brake control which increases the resistance of the exhaust gas and the retarded control can be used.

Moreover, in the above-mentioned embodiment, the inter-vehicle distance is used. However, it is also possible to use the inter-vehicle time interval for controlling the inter-vehicle distance.

<Second Embodiment>

The inter-vehicle distance control apparatus according to the second embodiment has substantially the same structure as that of the first embodiment. The difference is that judgment processing for a permanent error is further provided.

Figure 11:
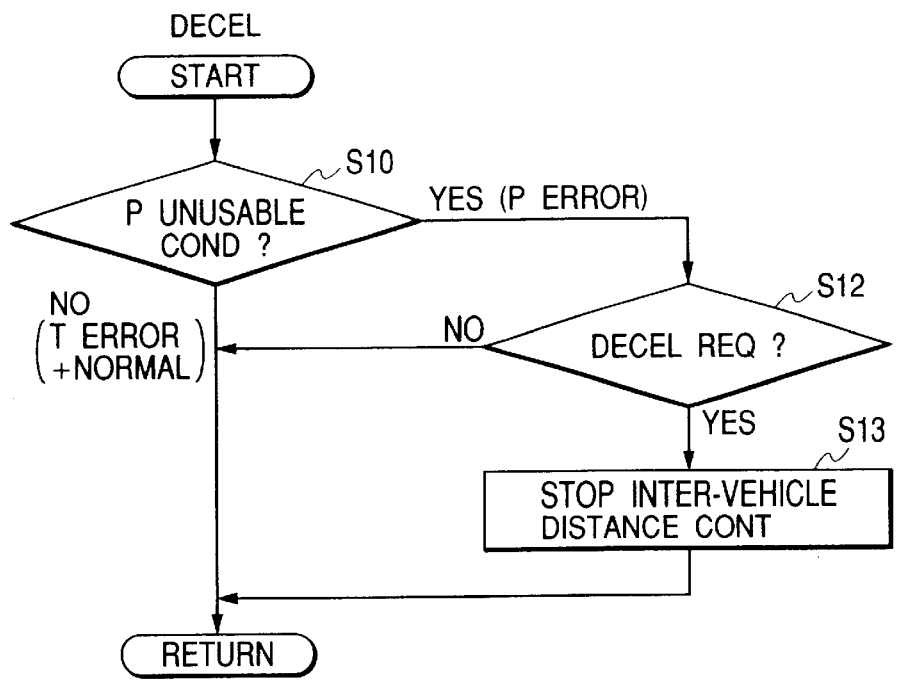
FIG. 11 depicts a flow chart of a permanent error judging operation in deceleration according to a second embodiment of the inter-vehicle distance control apparatus.

FIG. 11 depicts a flow chart for the inter-vehicle distance control apparatus according to the second embodiment.

The inter-vehicle distance control ECU 2 executes the inter-vehicle distance control in response to the auto-cruising switch to track the preceding vehicle with the inter-vehicle distance between the preceding vehicle and this vehicle controlled. The inter-vehicle distance control ECU 2 periodically executes the processing shown in FIG. 11 in response to a timer interruption. In step S10, the inter-vehicle distance control ECU 2 judges whether the deceleration is in a permanently unusable condition. For example, the inter-vehicle distance control ECU 2 checks that the brake pressure cannot be increased, the gear position cannot be changed, or the like. If the deceleration is in a permanently unusable condition, the inter-vehicle distance control ECU 2 further judges whether deceleration is required in the inter-vehicle distance controlling in step S12. If the deceleration is required in the inter-vehicle distance controlling, the inter-vehicle distance control ECU 2 stops the inter-vehicle distance control in step S13 and processing returns to the main routine.

In step S10, if the deceleration is not in the permanently unusable condition (permanent error), that is, in the normal condition or the temporarily unusable condition, the inter-vehicle distance control ECU 2 continues the operation of the inter-vehicle distance control and processing returns to the main routine.

The step S12 may be occasionally omitted.

Figure 12:
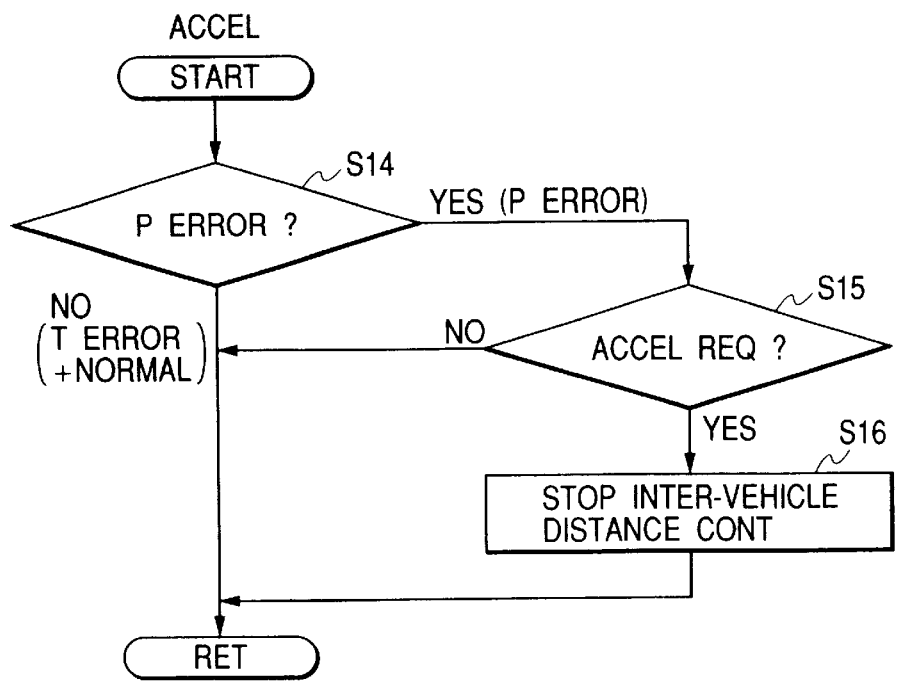
FIG. 12 depicts a flow chart of permanent error judging operation in acceleration according to the second embodiment of the inter-vehicle distance control apparatus.

The same operation is executed for the acceleration by steps S14 to S16 shown in FIG. 12.

Figure 13:
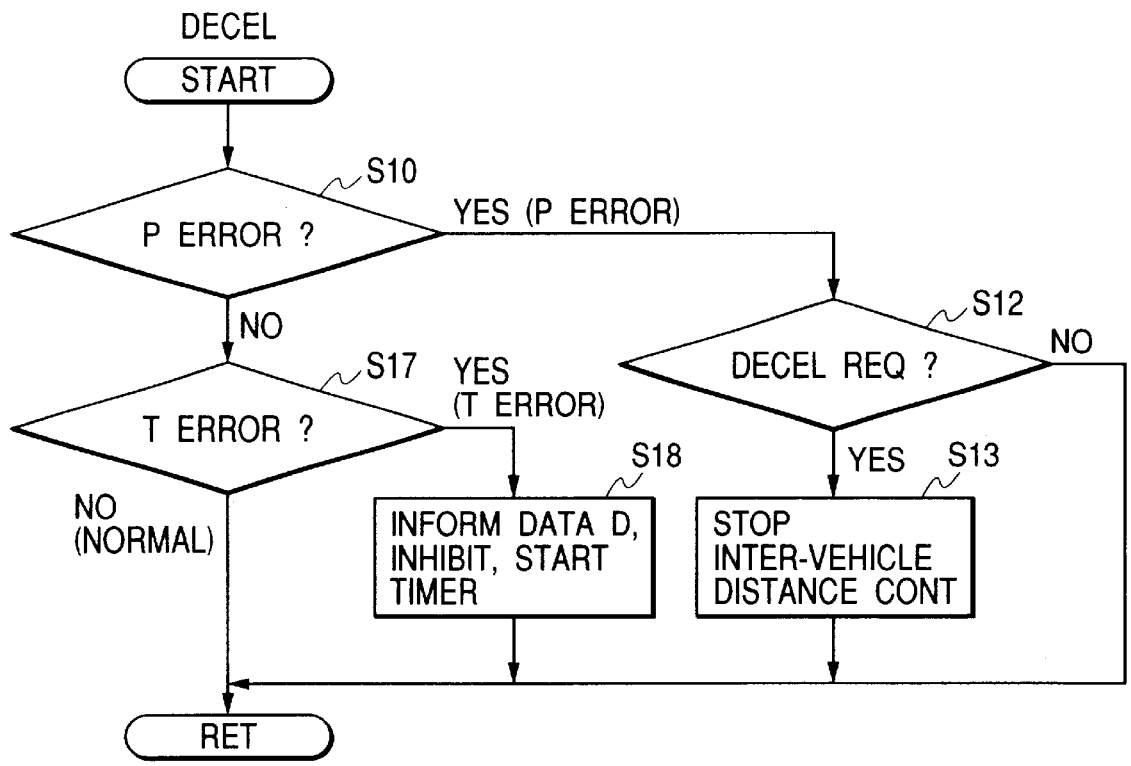
FIG. 13 depicts a flow chart of an error judging operation in deceleration according to the second embodiment of the inter-vehicle distance control apparatus.

FIG. 13 shows an additional operation for the decelerator.

In FIG. 13, processing in the steps S10 to S13 is the same as that in FIG. 11 and steps S17 and S18 are added. In step S10, if the deceleration is not in a permanently unusable condition, the inter-vehicle distance control ECU 2 judges whether the deceleration is in a temporary unusable condition in step S17. If the deceleration is in a temporary unusable condition, the inter-vehicle distance control ECU 2 sets the alarm flag to alarm the driver of temporary unusable condition of the deceleration in step S18, that is, the inter-vehicle distance control ECU 2 provides data D to the driver. Then the processing returns to the main routine. That is, the inter-vehicle distance control ECU 2 continues the control by the inter-vehicle distance control.

Moreover, in step S18, the inter-vehicle distance control ECU 2 inhibits use of the deceleration in temporary error, such as pressure increasing valve for the brake and starts a timer for measuring the time interval of inhibition. If the time interval of inhibition reaches a predetermined interval, the inhibition is cancelled and the unusable flag (mentioned later) is reset. If braking is requested when the inhibition is cancelled, the pressure increasing valve is actuated to decrease the vehicle velocity.

If the deceleration is not in a temporary unusable condition in step S17, the processing returns to the main routine. That is, the deceleration is in the normal condition, so that the inter-vehicle distance control ECU 2 continues the control by the automatic cruising with inter-vehicle distance controlled.

Figure 14:
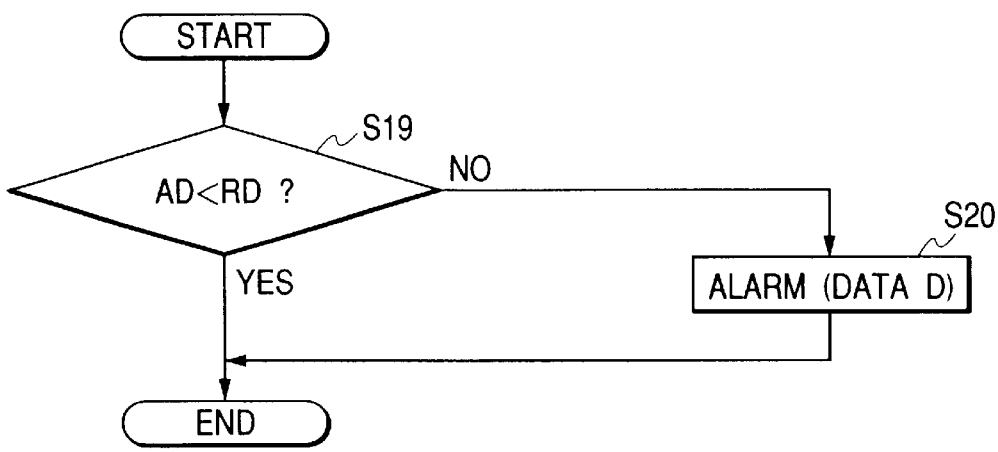
FIG. 14 depicts a flow chart of an alarming operation according to the second embodiment.

FIG. 14 depicts a partial flow chart for inter-vehicle distance control according to the second embodiment. The inter-vehicle distance control ECU 2 judges whether the actual inter-vehicle distance AC is shorter than a reference distance RD. If the actual inter-vehicle distance AC is shorter than the reference distance RD, the inter-vehicle distance control ECU 2 sets the alarm flag to inform the driver of data D2. The data D2 is equal to (agrees with) the data D informed in step S18.

Figure 15:
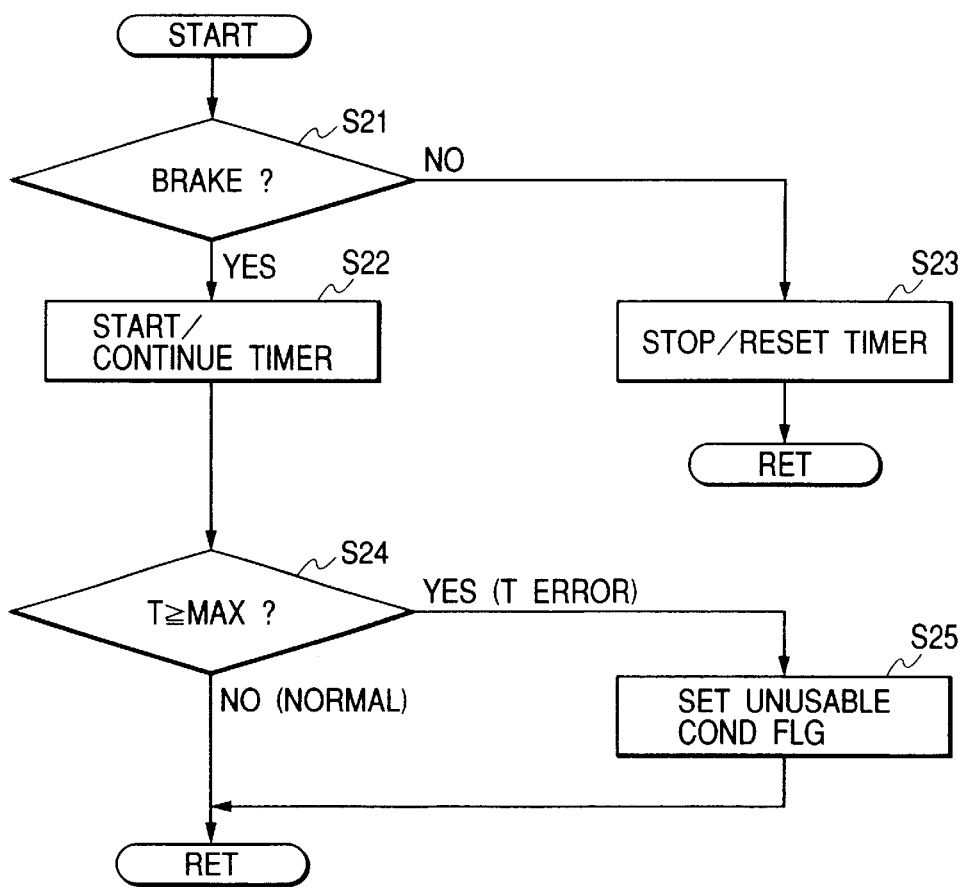
FIG. 15 depicts a flow chart of a temporary error judging operation according to the second embodiment of the inter-vehicle distance control apparatus.

FIG. 15 depicts a flow chart of detecting the temporarily unusable conation (temporary error). This operation is repeatedly executed in response to timer interruption.

In step S21, the inter-vehicle distance control ECU 2 judges whether the brake is operated, that is, the brake actuator is operated. If the brake actuator is operated, the inter-vehicle distance control ECU 2 starts a timer for measuring the continuous operation interval or if the timer has been started, the inter-vehicle distance control ECU 2 continues to operation of the timer in step S22. In the following step S24, the inter-vehicle distance control ECU 2 judges whether the continuous operation interval T reaches or exceeds the maximum continuous operation interval (rating). If the continuous operation interval T reaches the maximum continuous operation interval, the inter-vehicle distance control ECU 2 sets the unusable condition flag in step S25.

If the continuous operation interval T does not reach the maximum continuous operation interval, processing ends.

If the brake actuator is not operated in step S21, the inter-vehicle distance control ECU 2 stops and resets the timer in the microprocessor in the inter-vehicle distance control ECU 2. Thus, the timer measures the continuous operation of the brake actuators.

The inter-vehicle distance control ECU 2 judges the temporal error in step S17 by checking the unusable condition flag generated in step S25.

In this embodiment, the relations between the start and stop thresholds are as follows:

| start threshold/stop thresholds | |
|---|---|
| fuel cut: | $Aref11 > Aref12$ |
| OD cut: | $Aref21 > Aref22$ |
| DSTTGP: | $Aref31 > Aref32$ |
| braking: | $Aref41 > Aref42$ |

These relations provide another hysteresis control.

What is claimed is:

1. An inter-vehicle distance control apparatus comprising:
   acceleration means for accelerating a vehicle;
   deceleration means for decelerating said vehicle;
   inter-vehicle distance control means for calculating an inter-vehicle distance control amount in accordance with an inter-vehicle distance deviation and a relative velocity between said vehicle and a preceding vehicle and controlling said acceleration and deceleration means in accordance with the calculated inter-vehicle distance control amount to enable said vehicle to track the preceding vehicle, said inter-vehicle distance deviation being a difference between an actual inter-vehicle distance physical amount and a target inter-vehicle distance physical amount, said actual inter-vehicle distance physical amount corresponding to an actual inter-vehicle distance between said vehicle and the preceding vehicle, said target inter-vehicle distance physical amount corresponding to a target inter-vehicle distance between said vehicle and the preceding vehicle;
   judging means for judging whether said deceleration means is in a temporarily unusable condition, said temporarily unusable condition being that said deceleration means is currently unusable due to a known cause but will soon be usable again; and
   control means for causing said inter-vehicle distance control means to continue controlling said decelerating means when said inter-vehicle distance control means determines that control of said decelerating means is necessary and when said judging means determines that said decelerating means is in said temporarily unusable condition.

2. An inter-vehicle distance control apparatus as claimed in claim 1, further comprising informing means for informing a driver when said judging means judges that said deceleration means is in said temporarily unusable condition and said operation of said deceleration means is required by said inter-vehicle distance control means.

3. An inter-vehicle distance control apparatus as claimed in claim 1, further comprising:
   acceleration side judging means for judging whether said acceleration means is in a temporarily unusable condition; and
   acceleration control means for causing said inter-vehicle distance control means to continue controlling said acceleration means when said inter-vehicle distance control means determines that control of said acceleration means is necessary and said judging means determines that said acceleration means is in said temporarily unusable condition.

4. An inter-vehicle distance control apparatus as claimed in claim 2, wherein said informing means audibly alerts said driver when said actual inter-vehicle distance is shorter than a predetermined distance.

5. An inter-vehicle distance control apparatus as claimed in claim 1, wherein said deceleration means includes an actuator having a rating for controlling a brake pressure, said rating defining the maximum continuously operating interval, said inter-vehicle distance control apparatus further comprising detection means for detecting a continuously operating interval of said actuator, and said judging means judges that said deceleration means is in said temporarily unusable condition when said continuously operation interval reaches said maximum continuously operation interval.

6. A recording medium storing program data readable by a computer in an inter-vehicle distance control means comprising:

acceleration means for accelerating a vehicle;

deceleration means for decelerating said vehicle;

inter-vehicle distance control means for calculating an inter-vehicle distance control amount in accordance with an inter-vehicle distance deviation and a relative velocity between said vehicle and a preceding vehicle and controlling said acceleration and deceleration means in accordance with the calculated inter-vehicle distance control amount to enable said vehicle to track the preceding vehicle, said inter-vehicle distance deviation being a difference between an actual inter-vehicle distance physical amount and a target inter-vehicle distance physical amount, said actual inter-vehicle distance physical amount corresponding to an actual inter-vehicle distance between said vehicle and the preceding vehicle, said target inter-vehicle distance physical amount corresponding to a target inter-vehicle distance between said vehicle and the preceding vehicle;

judging means for judging whether said deceleration means is in a temporarily unusable condition, said temporarily unusable condition being that said deceleration means is currently unusable due to a known cause but will soon be usable again;

control means for causing said inter-vehicle distance control means to continue controlling said deceleration means when said inter-vehicle distance control means determines that control of said deceleration means is necessary and when said judging means determines that said deceleration means is in said temporarily unusable condition.

7. A recording medium as claimed in claim 6, wherein said inter-vehicle distance control apparatus further comprising informing means for informing a driver when said judging means judges that said deceleration means is in said temporarily unusable condition and said operation of said deceleration means is required by said inter-vehicle distance control means.

8. A recording medium as claimed in claim 6, wherein said inter-vehicle distance control apparatus further comprises:

acceleration side judging means for judging whether said acceleration means is in a temporarily unusable condition; and acceleration control means for causing said inter-vehicle distance control means to continue controlling said acceleration means when said inter-vehicle distance control means determines that control of said acceleration means is necessary and said judging means determines that said acceleration means is in said temporarily unusable condition.

9. A recording medium as claimed in claim 6, wherein said informing means audibly alerts said driver when said actual inter-vehicle distance is shorter than a predetermined distance.

10. A recording medium as claimed in claim 6, wherein said deceleration means includes an actuator having a rating for controlling a brake pressure, said rating defining the maximum continuously operating interval, said inter-vehicle distance control apparatus further comprising detection means for detecting a continuously operating interval of said actuator, said judging means judges that said deceleration means is in said temporarily unusable condition when said continuously operation interval reaches said maximum continuously operation interval.

11. An inter-vehicle distance control apparatus comprising:

acceleration means for accelerating a vehicle;

deceleration means for decelerating said vehicle;

inter-vehicle distance control means for calculating an inter-vehicle distance control amount in accordance with an inter-vehicle distance deviation and a relative velocity between said vehicle and a preceding vehicle and controlling said acceleration and deceleration means in accordance with the calculated inter-vehicle distance control amount to enable said vehicle to track the preceding vehicle, said inter-vehicle distance deviation being a difference between an actual inter-vehicle distance physical amount and a target inter-vehicle distance physical amount, said actual inter-vehicle distance physical amount corresponding to an actual inter-vehicle distance between said vehicle and the preceding vehicle, said target inter-vehicle distance physical amount corresponding to a target inter-vehicle distance between said vehicle and the preceding vehicle;

detection means for detecting a condition of said deceleration means;

judging means for judging whether said deceleration means is in a permanently unusable condition or a continuing condition in accordance with the detected condition, said continuing condition including a temporarily unusable condition and a normal condition of said deceleration means; and control means for causing said inter-vehicle distance control means to suspend control of said acceleration and deceleration means when said judging means judges that said deceleration means is in said permanently unusable condition and operation of said deceleration means is required by said inter-vehicle distance control means and continuing said control by said inter-vehicle distance controls means when said judging means judges that said deceleration means is in said continuing condition and operation of said deceleration means is required by said inter-vehicle distance control means.

12. An inter-vehicle distance control apparatus as claimed in claim 11, further comprising informing means for informing a driver when said judging means judges that said deceleration means is in said temporarily unusable condition and said operation of said deceleration means is required by said inter-vehicle distance control means.

13. An inter-vehicle distance control apparatus as claimed in claim 11, further comprising:

acceleration side judging means for judging whether said acceleration means is in a permanently unusable condition or a continuing condition in accordance with a detected condition, said continuing condition of said acceleration means including a temporarily unusable condition and a normal condition of said acceleration means; and acceleration control means for causing said inter-vehicle distance control means to suspend control of said acceleration and deceleration means when said acceleration side judging means judges that said acceleration means is in said permanently unusable condition and operation of said acceleration means is required by said inter-vehicle distance control means and continuing said control by said inter-vehicle distance control means when said acceleration side judging means judges that said acceleration means is in said temporarily unusable condition and said operation of said acceleration means is required by said inter-vehicle distance control means, wherein said control means and said acceleration control means effect common operations between when said judging means judges that said deceleration means is in said temporarily unusable condition and said operation of said deceleration means is required by said inter-vehicle distance control means and when said acceleration side judging means judges that said acceleration means is in said temporarily unusable condition and said operation of said acceleration means is required by said inter-vehicle distance control means.

14. An inter-vehicle distance control apparatus as claimed in claim 12, wherein said informing means audibly alerts said driver when said actual inter-vehicle distance is shorter than a predetermined distance.

15. An inter-vehicle distance control apparatus as claimed in claim 11, wherein said deceleration means includes an actuator having a rating for controlling brake pressure, said rating defining a maximum continuously operating interval, said inter-vehicle distance control apparatus further comprising detection means for detecting a continuously operating interval of said actuator, said judging means judges that said deceleration means is in said temporarily unusable condition when said continuously operating interval reaches said maximum continuously operating interval.

* * * * *